United States Patent
Kohls et al.

(10) Patent No.: US 7,722,061 B2
(45) Date of Patent: May 25, 2010

(54) STEERING DAMPERS AND VEHICLES INCLUDING SAME

(75) Inventors: Mark T. Kohls, Marysville, OH (US); James E. Kerker, Marysville, OH (US)

(73) Assignee: Honda Motor Company, Ltd., Tokyo (JP)

( * ) Notice: Subject to any disclaimer, the term of this patent is extended or adjusted under 35 U.S.C. 154(b) by 205 days.

(21) Appl. No.: 12/099,277

(22) Filed: Apr. 8, 2008

(65) Prior Publication Data

US 2009/0250893 A1    Oct. 8, 2009

(51) Int. Cl.
    *B62D 7/22*    (2006.01)
(52) U.S. Cl. .................. 280/90; 280/89.11; 280/89.13
(58) Field of Classification Search .................. 280/90, 280/89, 89.1, 89.11, 89.12, 89.13
    See application file for complete search history.

(56) References Cited

U.S. PATENT DOCUMENTS

| | | | |
|---|---|---|---|
| 2,049,111 A * | 7/1936 | Dunham | 192/223.4 |
| 4,588,198 A * | 5/1986 | Kanazawa et al. | 280/90 |
| 5,076,383 A | 12/1991 | Inoue et al. | |
| 5,685,555 A | 11/1997 | McCormick et al. | |
| 6,120,046 A | 9/2000 | Daly | |
| 6,581,948 B2 | 6/2003 | Fox | |
| 6,637,558 B2 | 10/2003 | Oliver et al. | |
| 6,681,883 B2 | 1/2004 | Loh et al. | |
| 6,848,698 B2 | 2/2005 | Hasegawa et al. | |
| 2003/0178243 A1 | 9/2003 | Mosler et al. | |
| 2005/0151341 A1 | 7/2005 | Iwamoto et al. | |
| 2005/0274582 A1 | 12/2005 | Tomonaga | |

FOREIGN PATENT DOCUMENTS

| | | |
|---|---|---|
| JP | 2001301682 A | 10/2001 |
| WO | WO03070551 A1 | 8/2003 |

\* cited by examiner

*Primary Examiner*—Eric Culbreth
(74) *Attorney, Agent, or Firm*—Ulmer & Berne LLP (57) ABSTRACT

A steering damper includes a cylinder housing, a piston, a piston rod, and a valve member. The cylinder housing includes an inner surface and the inner surface defines an inner area. The piston is at least partially disposed within the inner area and is movably engaged with the inner surface of the cylinder housing. The piston and the inner surface of the cylinder housing cooperate to define a first chamber and a second chamber disposed upon opposite sides of the piston. The piston rod is attached to the piston. At least one of the piston and the piston rod at least partially defines a passageway extending between the first chamber and the second chamber. The valve member is associated with the passageway and is movable to adjust restriction of fluid flow through the passageway between the first chamber and the second chamber. A vehicle is also provided.

18 Claims, 8 Drawing Sheets

STEERING DAMPERS AND VEHICLES INCLUDING SAME

TECHNICAL FIELD

A steering damper may comprise a valve member for adjusting restriction of fluid flow within the steering damper. In one embodiment, the valve member may adjust restriction of fluid based upon shock impulses on a steering assembly.

BACKGROUND

During certain atypical driving conditions (e.g., uneven terrain, sudden braking, tire blow out, or the like), shock impulses may cause a vehicle's steering assembly to suddenly pivot or kickback. This kickback may suddenly change the course of the vehicle and thereby affect the overall performance of the vehicle. Conventionally, a steering damper is provided on a vehicle to dampen the shock impulses and thus reduce the effects of kickback. However, such steering dampers also hinder an operator's ability to steer the vehicle during normal driving conditions, thereby inhibiting an operator's ability to quickly steer the vehicle, and resulting in fatigue to the operator and/or limiting full turning of the vehicle.

SUMMARY

In accordance with one embodiment, a steering damper comprises a cylinder housing, a piston, a piston rod, and a valve member. The cylinder housing comprises an inner surface and the inner surface defines an inner area. The piston is at least partially disposed within the inner area and is movably engaged with the inner surface of the cylinder housing. The piston and the inner surface of the cylinder housing cooperate to define a first chamber and a second chamber disposed upon opposite sides of the piston. The piston rod is attached to the piston. At least one of the piston and the piston rod at least partially defines a passageway extending between the first chamber and the second chamber. The valve member is associated with the passageway and is movable to adjust restriction of fluid flow through the passageway between the first chamber and the second chamber.

In accordance with another embodiment, a vehicle comprises a frame, a steering shaft, and a steering damper. The steering shaft is pivotally supported with respect to the frame. The steering damper is attached to the frame and the steering shaft. The steering damper comprises a cylinder housing, a piston, a piston rod, and a valve member. The cylinder housing comprises an inner surface and the inner surface defines an inner area. The piston is at least partially disposed within the inner area and is movably engaged with the inner surface of the cylinder housing. The piston and the inner surface of the cylinder housing cooperate to define a first chamber and a second chamber disposed upon opposite sides of the piston. The piston rod is attached to the piston. At least one of the piston and the piston rod at least partially defines a passageway extending between the first chamber and the second chamber. The valve member is associated with the passageway and is movable to adjust restriction of fluid flow through the passageway between the first chamber and the second chamber.

In accordance with yet another embodiment, a steering damper comprises a cylinder housing, a piston, a piston rod, a valve member, and a biasing member. The cylinder housing comprises an inner surface and the inner surface defines an inner area. The piston is at least partially disposed within the inner area and is movably engaged with the inner surface of the cylinder housing. The piston and the inner surface of the cylinder housing cooperate to define a first chamber and a second chamber disposed upon opposite sides of the piston. The piston rod is attached to the piston. At least one of the piston and the piston rod at least partially defines a passageway, a first valve seat, and a second valve seat. The passageway extends between the first chamber and the second chamber. The first valve seat and the second valve seat are adjacent to the passageway. The valve member comprises a first valve face and a second valve face. The valve member is disposed at least partially within the passageway such that the first valve face corresponds with the first valve seat and the second valve face corresponds with the second valve seat. The valve member is movable to adjust restriction of fluid flow through the passageway between the first chamber and the second chamber. The biasing member is configured to bias the valve member with respect to the passageway.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
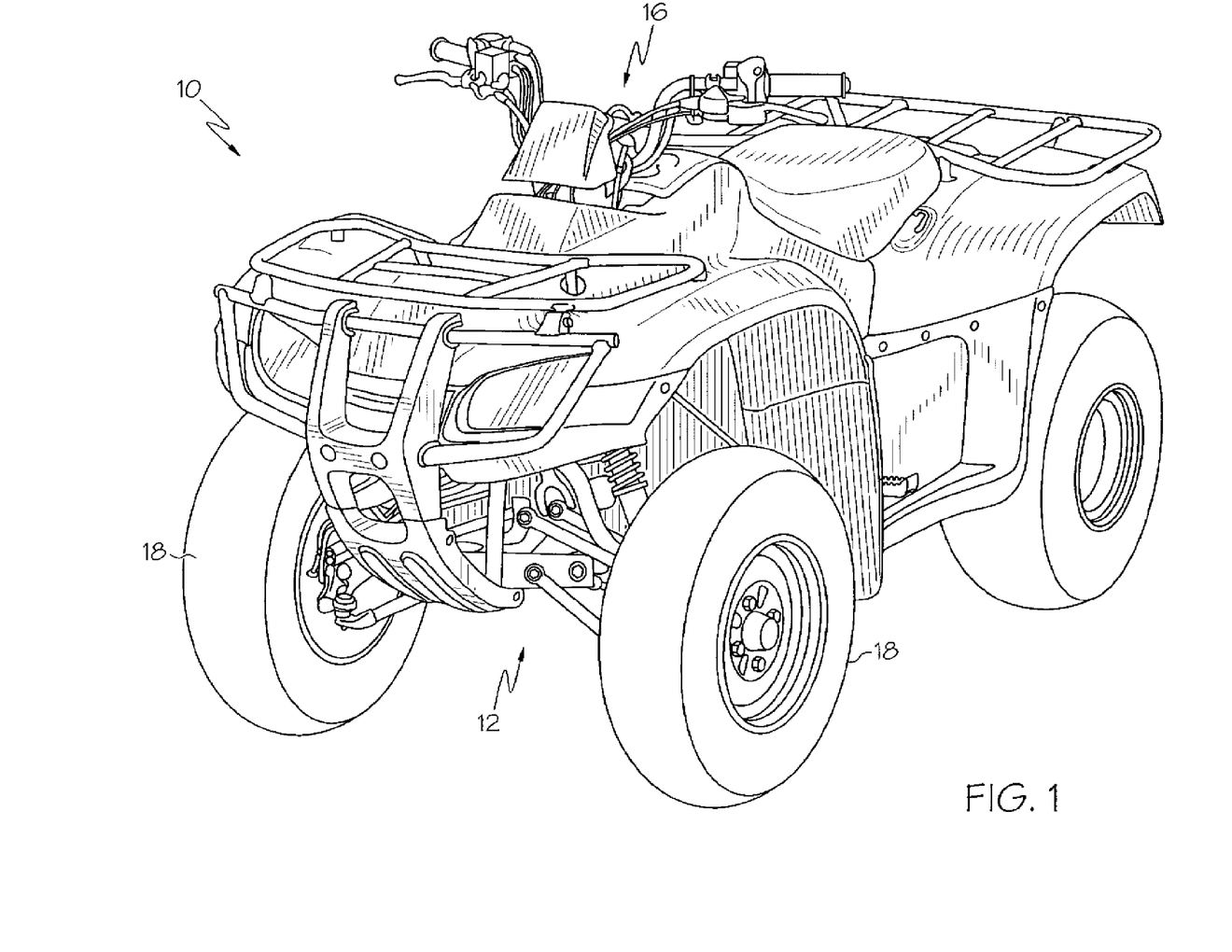
FIG. 1 is a front perspective view depicting an all terrain vehicle ("ATV") in accordance with one embodiment.
Figure 2:
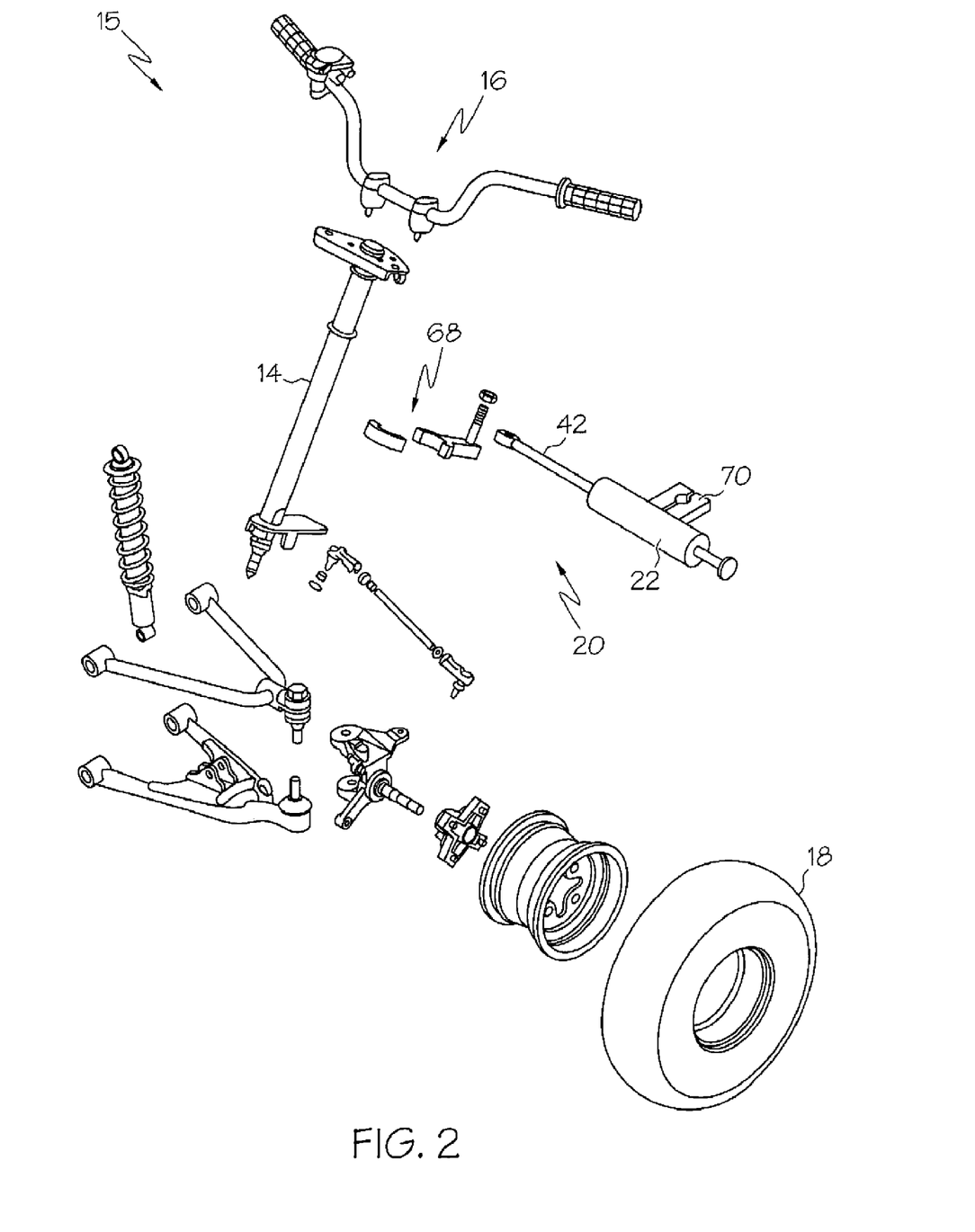
FIG. 2 is an exploded perspective view depicting a steering assembly, a steering damper, and certain other components of the ATV apart from the remaining components of the ATV of FIG. 1, which have been removed for clarity of illustration.

The present invention and its operation are hereinafter described in detail in connection with the views and examples of FIGS. 1-8. In accordance with one embodiment, a steering assembly can be included on a vehicle to facilitate steering of the vehicle. A vehicle can comprise an ATV 10 as shown in FIG. 1, for example. However, in alternative embodiments, a vehicle can comprise other saddle-type vehicles (e.g., a bicycle, a motorcycle, a personal watercraft (PWC), a scooter, or a snowmobile), an automobile, a utility vehicle, a toy, or the like. In one embodiment, as illustrated in FIGS. 1 and 2, ATV 10 can include a steering assembly 15 comprising a handlebar 16 and a steering member 14. As will be appreciated from FIG. 2, the handlebar 16 may be connected to the steering member 14, and the steering member 14 may be connected to wheels 18 through any of a variety of suitable linkages and suspension assemblies (e.g., one of which is shown in FIG. 2). The steering member 14 may be pivotally supported with respect to a frame 12 such that an operator may turn the handlebar 16 to pivot the steering member 14 and correspondingly steer the wheels 18. Although the ATV 10 is shown in FIG. 1 to comprise two steerable front wheels (i.e., 18), it will be appreciated that a vehicle may comprise any quantity of steerable wheels in any of a variety of arrangements (e.g., one front steerable wheel, two rear steerable wheels). It will also be appreciated that a steering assembly may be provided in any of a variety of suitable alternative arrangements for steering at least one wheel of a vehicle.

Figure 4:
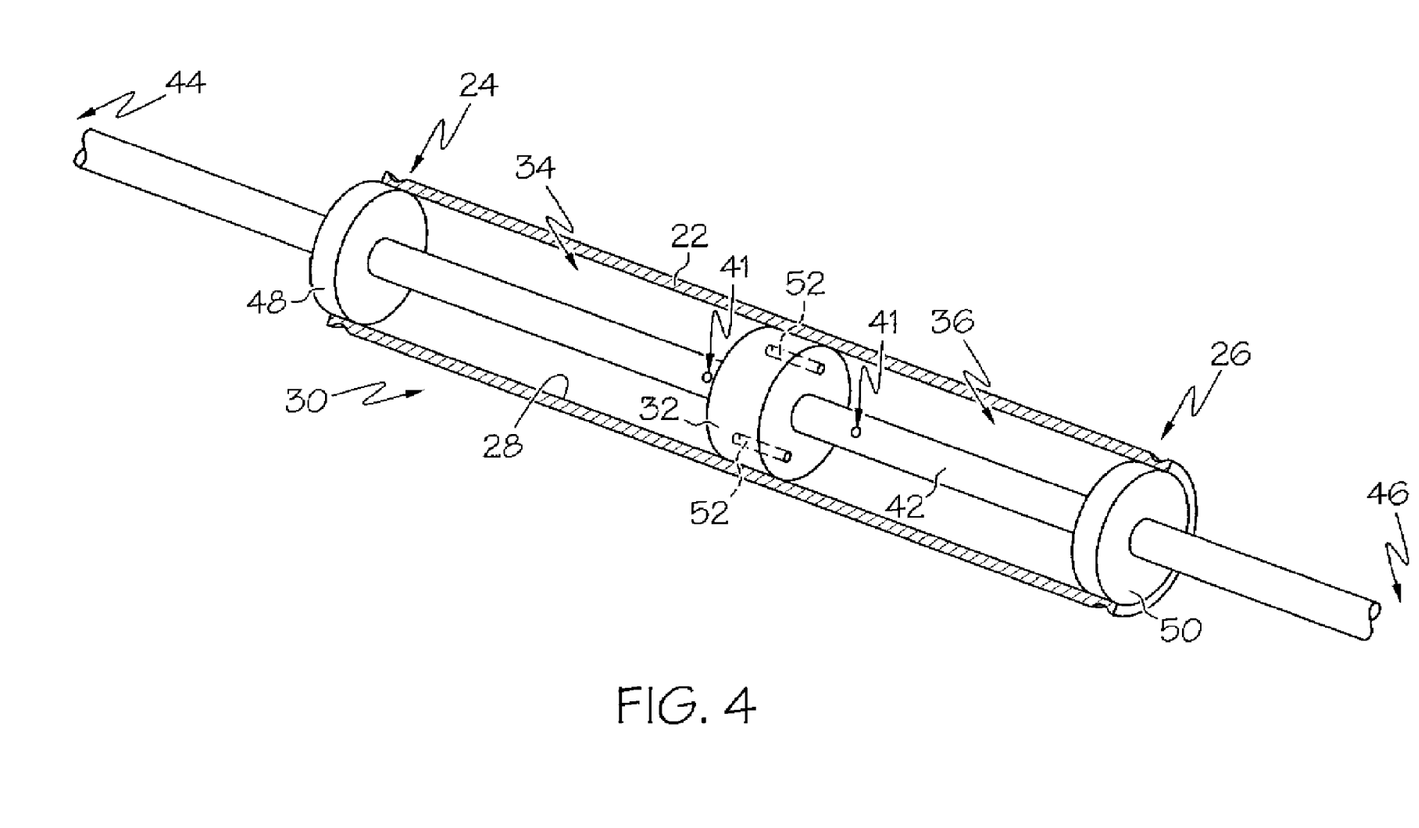
FIG. 4 is a perspective view depicting a steering damper in accordance with one embodiment, wherein a portion of the steering damper has been cut away for clarity of illustration.

A vehicle may comprise a steering damper. As will be described in more detail below, the steering damper may dampen kickback of a steering assembly and/or wheels of a vehicle. As illustrated in FIG. 4, the steering damper 20 may comprise a cylinder housing 22 and a piston 32. The cylinder housing 22 may comprise an inner surface 28 which defines an inner area. The piston 32 may be engaged with the inner surface 28 such that the piston 32 is disposed at least partially within the inner area. In one embodiment, as shown in FIG. 4, the inner surface 28 may define a substantially cylindrical inner area. In such an embodiment, the piston 32 may contact the inner surface 28 of the cylinder housing 22 such that the piston 32 is disposed within the inner area. Although the piston 32 is depicted to be completely disposed within the inner area, it will be appreciated that a piston may alternatively be only partially disposed within the inner area.

A piston may be movable within the inner area. As illustrated in FIG. 4, the inner surface 28 may extend between a first end 24 and a second end 26 of the cylinder housing 22 such that the piston 32 is slidable between the first end 24 and the second end 26. As illustrated in FIG. 4, the piston 32 is shown to be frictionally engaged with the inner surface 28 such that a viscous fluid (not shown) may facilitate sliding of the piston 32 between the first end 24 and the second end 26 of the cylinder housing 22. It will be appreciated that a piston may be movably engaged with an inner surface of a cylinder housing in any variety of alternative configurations.

Figure 3:
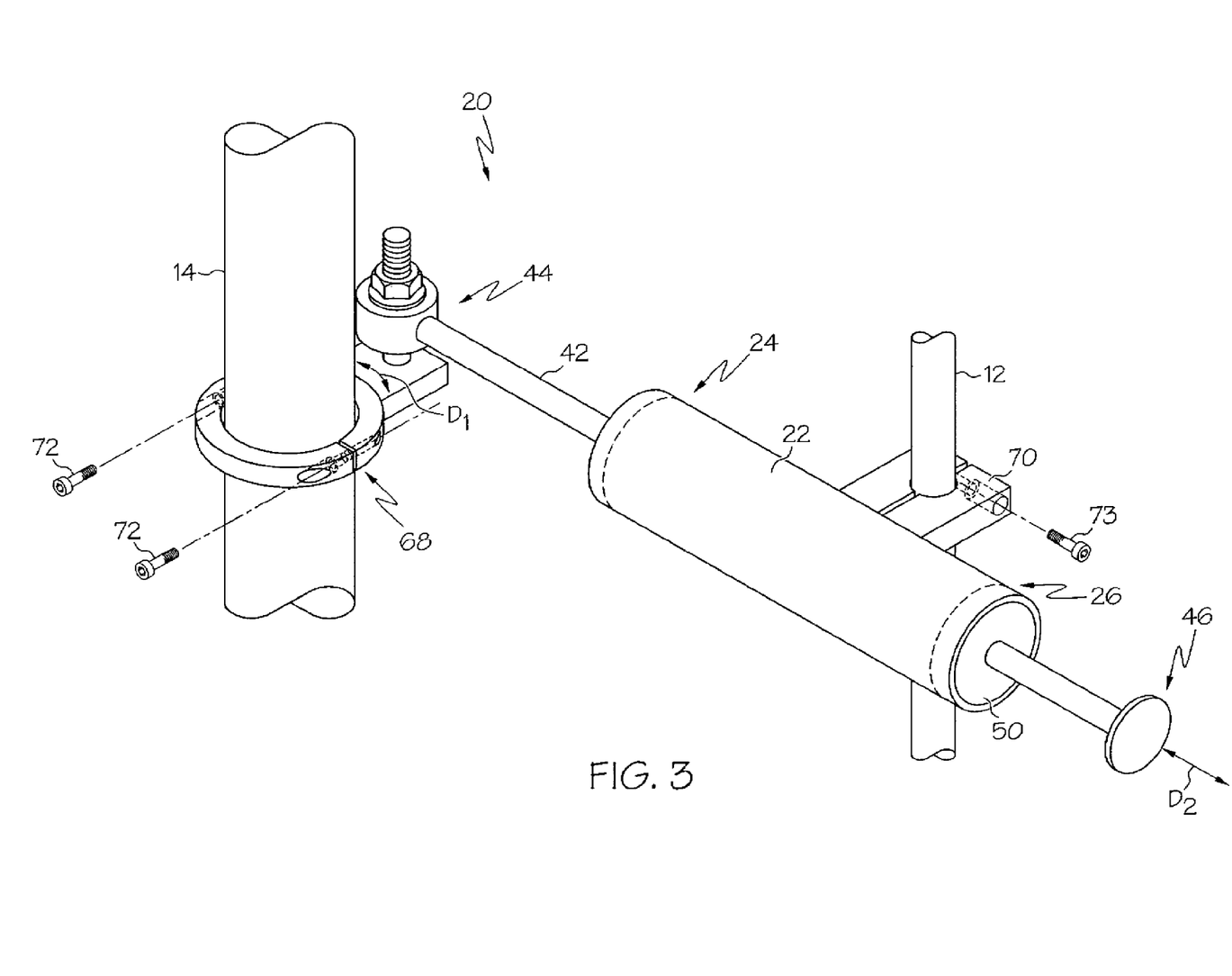
FIG. 3 is an enlarged perspective view depicting the steering damper attached to the steering assembly of FIG. 2 and to a frame of the ATV of FIG. 1.
Figure 5:
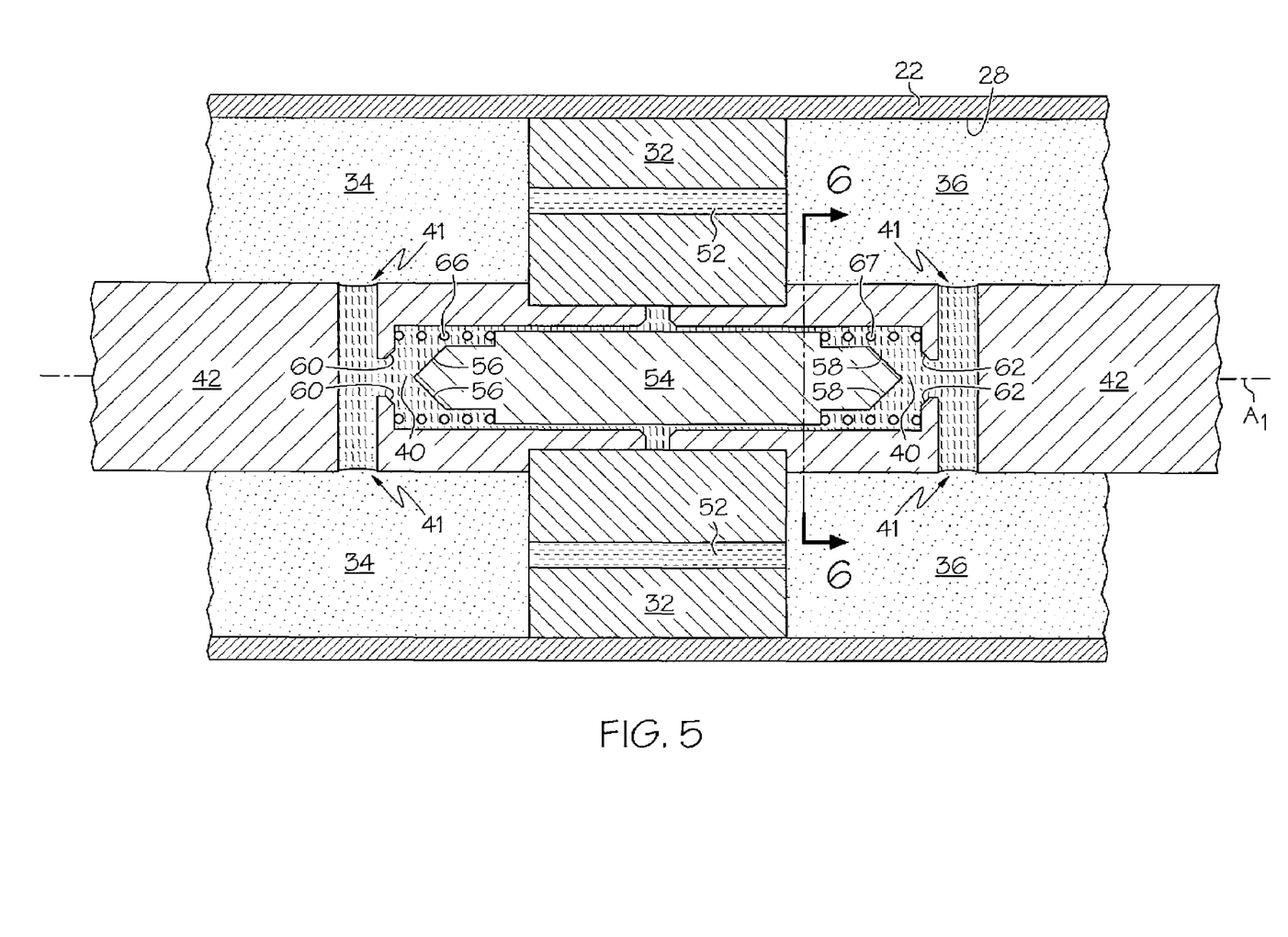
FIG. 5 is a cross-sectional view depicting a portion of the steering assembly of FIG. 4.

The steering damper may comprise a piston rod associated with the piston such that movement of the piston rod correspondingly moves the piston. In one embodiment, and as illustrated in FIGS. 3 and 4, the piston rod 42 may comprise an elongate member extending between a first end 44 and a second end 46. In such an embodiment, as shown in FIG. 5, the piston rod 42 may comprise two separate elongate members which are attached (e.g., by welding or threading) to opposite sides of the piston 32. In another embodiment, a single, continuous piston rod may extend through the piston and may be attached (e.g., by welding) to the piston. In yet another embodiment, a piston rod might be formed integrally with a piston. While a steering damper might include a piston rod extending from opposite sides of a piston and through respective ends of a cylinder housing, as shown in FIGS. 3-4, it will be appreciated that a steering damper might alternatively comprise a piston rod extending from only a single side of a piston and through a single end of a cylinder housing. It will be therefore be appreciated that a piston and a piston rod may be provided in any of a variety of suitable configurations.

The steering damper may be attached to a vehicle's steering assembly such that movement of the steering assembly correspondingly moves the piston with respect to the cylinder housing. In one embodiment, as illustrated in FIG. 3, the steering damper 20 may be attached to the steering member 14 and the frame 12 of the ATV 10. A collar 68 may be engaged with the steering member 14 (e.g., with fasteners 72) and pivotally connected with the first end 44 of the piston rod 42. A clamp 70 may be fixedly attached to the cylinder housing 22 and attached to the frame 12 of the ATV 10 (e.g., with fastener 73). In such an embodiment, during pivoting of the steering member 14 (e.g., in the direction of arrow $D_1$), the cylinder housing 22 may remain substantially at rest such that the piston rod 42 and piston (32 shown in FIG. 4) slide along the length of the cylinder housing 22 (e.g., in the direction of arrow $D_2$). It will be appreciated that a steering damper may be attached to a steering assembly in any of a variety of alternative configurations and arrangements. For example, a steering damper may be attached between a handlebar and a frame of a vehicle. In another example, a steering damper may be attached between a steering knuckle and frame of a vehicle.

Fluid may be provided within a steering damper to facilitate dampening of piston movement (as will be described in more detail below). In one embodiment, the fluid may comprise a viscous fluid (e.g., hydraulic oil). In another embodiment, the fluid may comprise a compressible gas (e.g., nitrogen). It will be appreciated that any of a variety of fluids may be provided to facilitate dampening of a steering assembly by a piston.

To accommodate such fluid within a steering damper, a piston and an inner surface of a cylinder housing may cooperate to define a first chamber and a second chamber disposed upon opposite sides of the piston. In one embodiment, as illustrated in FIG. 4, the piston 32 may be disposed between the first end 24 and the second end 26 of the cylinder housing 22. In such an embodiment, the piston 32 may divide the inner area of the cylinder housing 22 such that the first chamber 24 is located adjacent to the first end 24 of the cylinder housing 22 and such that the second chamber 36 is located adjacent to the second end 26 of the cylinder housing 22. It will be appreciated that a piston may cooperate with an inner surface of a cylinder housing in any of a variety of other suitable configurations to define one or more chambers. It will also be appreciated that a fluid seal may be formed between the piston 32 and the inner surface 28 of the cylinder housing 22 such that fluid is impeded from flowing between the piston 32 and the inner surface 28.

To maintain fluid within a steering damper, oil seals may be attached to a cylinder housing. As illustrated in FIGS. 3 and 4, a first oil seal 48 and a second oil seal 50 may be respectively attached to the first end 24 and the second end 26 of the cylinder housing 22 to seal fluid within the cylinder housing 22 (e.g., within the first chamber 34 and the second chamber 36). In such an embodiment, the first end 44 and the second end 46 of the piston rod 42 may respectively extend through the first oil seal 48 and the second oil seal 50 such that fluid is maintained within the cylinder housing 22 during movement of the piston 32 and the piston rod 42. It will be appreciated that an oil seal may comprise any of a variety of suitable devices or arrangements for maintaining fluid within a cylinder housing. In one alternative embodiment, in which only one end of a piston rod extends from a cylinder housing, a cap may be provided to completely close and seal another end of the cylinder housing.

It will be appreciated that when a piston moves within a cylinder housing, the volumes of fluid within the cylinder housing on each side of the piston may change. Therefore, to allow movement of a piston within a cylinder housing (e.g., during pivoting of the handlebar 16), fluid may be communicated between respective chambers (e.g., 34 and 36 shown in FIG. 4) of the steering damper. At least one fluid path may be provided between such chambers to facilitate such communication of fluid. In one embodiment, as shown in FIG. 5, the fluid path may comprise a passageway 40. The passageway 40 is shown in FIG. 5 to be defined by the piston rod 42 and to extend generally along a central axis $A_1$. The piston rod 42 may include ports 41 which respectively extend from each end of the passageway 40 and into the first chamber 34 and the second chamber 36. In other embodiments, it will be appreciated that a passageway may be defined by a piston, through cooperation of a piston and a piston rod, through cooperation of a piston with an inner surface of a cylinder housing, or in any of a variety of other configurations.

Maintaining a passageway internal to a steering damper, as described above, may facilitate a compact design for the steering damper. In particular, this configuration can avoid the presence of any external fluid paths or conduits which might otherwise enlarge the overall size and weight of the steering damper and adversely impact the aesthetics and streamlined nature of the steering damper. Furthermore, this configuration renders the steering damper unlikely to sustain damage from passing debris and brush.

Restriction of fluid flow between the first chamber 34 and the second chamber 36 can result in dampening of movement of the piston 32 with respect to the cylinder housing 22. For example, the piston 32 may move freely (i.e., undamped) within the cylinder housing 22 so long as the fluid displaced by movement of the piston 32 flows freely through the fluid path(s) (e.g., the apertures 52 and/or the passageway 40 shown in FIG. 5). However, if the flow of fluid through the fluid path(s) is restricted, movement of the piston 32 can be correspondingly dampened. Accordingly, adjusting the restriction of fluid flow between the first chamber 34 and the second chamber 36 may affect the manner in which movement of the piston is dampened. For example, by increasing the restriction of fluid flow through the fluid path(s), movement of the piston 32 with respect to the cylinder housing 22 can be dampened.

Selective restriction of fluid flow through one or more of the fluid path(s) can be achieved in any of a variety of suitable configurations. In one embodiment, a valve member may be associated with a passageway to facilitate selective adjustment of the restriction of fluid flow through the passageway. For example, as illustrated in FIG. 5, a valve member 54 may comprise an elongate member having a first valve face 56 defined by a first end of the valve member 54 and a second valve face 58 defined by a second end of the valve member 54. The valve member 54 is shown to be disposed within the passageway 40 such that the first valve face 56 corresponds with a first valve seat 60 and the second valve face 58 corresponds with a second valve seat 62. However, it will be appreciated that a valve member may be associated with a passageway in any of a variety of alternative configurations and arrangements. For example, a valve member may be partially disposed within a passageway such that a portion of the valve member can extend outside of the passageway. It will also be appreciated that a valve member may comprise any of a variety of alternative shapes and sizes. For example, a valve member may alternatively comprise a spherical member.

The valve member may be movable to adjust restriction of fluid flow through a passageway between the first chamber and the second chamber. In one embodiment, as shown in FIG. 5, the valve member 54 may be slidable within the passageway 40 (e.g., along the axis $A_1$) and into selective and alternative contact with the first and second valve seats 60 and 62. Although the valve member 54 can slidingly contact portions of the piston rod 42, it will be appreciated that a valve member may be movably supported with respect to a piston and/or piston rod in any of a variety of alternative arrangements.

Figure 6:
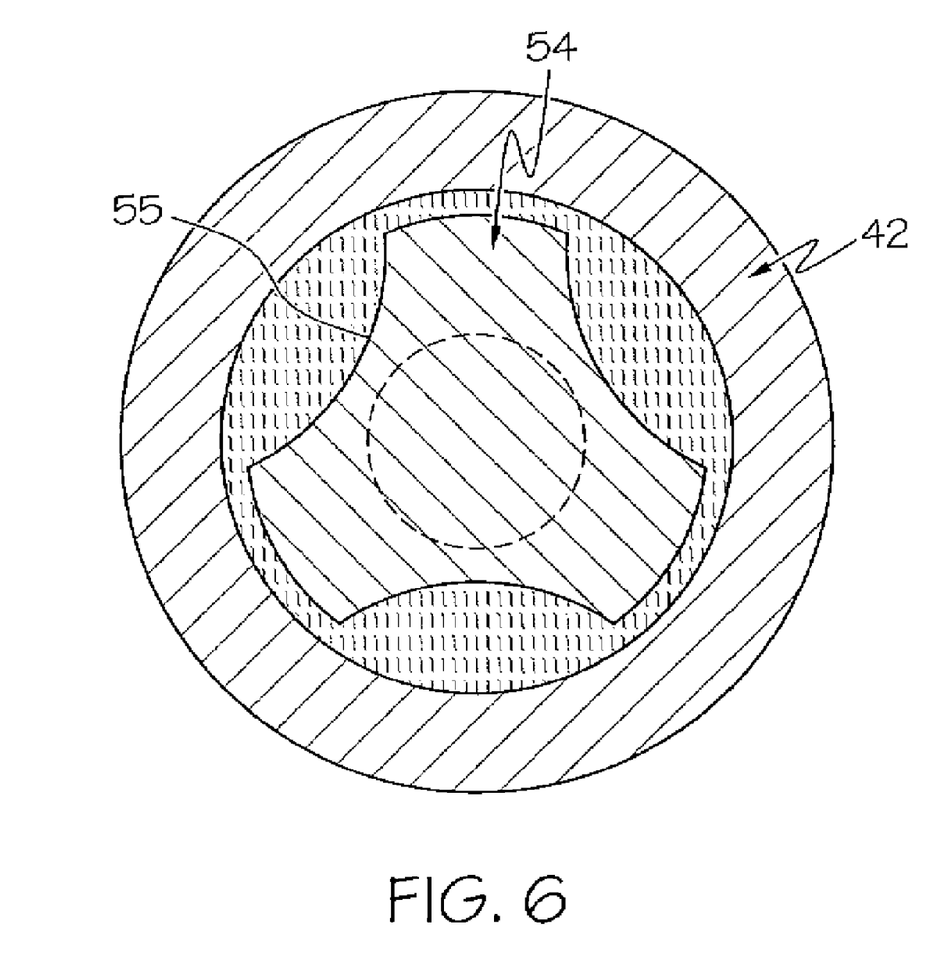
FIG. 6 is a cross-sectional view taken along section lines 6-6 in FIG. 5.

It will be appreciated that a valve member may be movable between any of a variety of positions to adjust restriction of fluid flow through a passageway. In one embodiment, as in the example of FIG. 5, the valve member 54 may be slidable along a straight path between a first position, a second position, and a third position. Referring to FIG. 5, in the first position, the first valve face 56 of the valve member 54 may contact the first valve seat 60 to prevent fluid flow through the passageway 40. In the second position, the second valve face 58 of the valve member 54 may contact the second valve seat 62 to also prevent fluid from flowing through the passageway 40. In a third position, as illustrated in FIG. 5, the first valve face 56 of the valve member 54 may be spaced from the first valve seat 60 and the second valve face 58 may be spaced from the second valve seat 62 to facilitate fluid flow through the passageway 40. When in the third position, fluid can flow around the valve member 54 (e.g., between indented portion 55 of the valve member 54 and portions of the piston rod 42 which define the passageway 40, as shown in FIGS. 5-6), and thus through the passageway 40. In this configuration, the valve member 54 can accordingly slide along a straight path from the first position, past the third position, and to the second position. As described above, facilitation of fluid flow through the passageway 40 can result in easier movement of the piston 32 through the inner area of the cylinder housing 22.

During normal operation of the ATV 10, the valve member 54 may be provided in the third position (as shown in FIG. 5) to allow fluid to flow freely between the first chamber 34 and the second chamber 36, and thus to allow undampened steering of the wheels 18 by an operator. However, when the steering assembly 15 encounters kickback, a sudden acceleration of the piston 32 may result which can cause the valve member 54 to move from the third position to one of the first and second positions (depending on the direction of the acceleration). Such movement of the valve member 54 can result in restricting the flow of fluid through the passageway 40. As described above, this restriction can dampen movement of the piston 32 within the cylinder housing 22 and can accordingly facilitate dampening of the steering assembly 15 by the steering damper 20. When the kickback subsides, the valve member 54 may move back to the third position to permit undampened operation of the steering assembly 15. It will be appreciated that such an arrangement facilitates undampened operation of the steering assembly 15 during normal riding of the ATV 10 (in which circumstance steering action and terrain feedback is generally gradual), but only effects dampening of the steering assembly when the ATV 10 experiences kickback or other extreme conditions. Accordingly, during normal operation of the ATV 10, provision of the steering damper 20 does not require exertion of significant excess energy by an operator of the ATV 10, and therefore facilitates selective dampening of the steering assembly 15 without significantly increasing the likelihood of contributing to operator fatigue.

It will be appreciated that a steering damper may comprise one or more biasing members which can be disposed at least partially within a passageway or otherwise associated with a valve member. The biasing member(s) may bias the valve member with respect to the passageway. For example, as shown in FIG. 5, the steering damper 20 may comprise a first spring 66 and a second spring 67. The first spring 66 can be disposed within the passageway 40 adjacent to the first valve seat 60 and the first end of the valve member 54. The second spring 67 can be disposed within the passageway 40 adjacent to the second valve seat 62 and the second end of the valve member 54. In such an embodiment, during normal driving conditions, the first spring 66 and the second spring 67 may bias the valve member 54 to the third position. However, at least one of the first spring 66 and the second spring 67 may be compressed during rapid accelerations of the piston 32. It will be appreciated that the force of the first and second springs 66, 67 on the valve member 54 may affect the dampening characteristics of the steering damper 20. For example, increasing the amount of spring force can increase the amount of acceleration which the piston 32 must experience to result in movement of the valve member 54 and resultant dampening by the steering damper 20.

In addition to the passageway 40, the steering damper might also comprise one or more additional flow paths. For example, as shown in FIGS. 4-5, the piston 32 can be provided with apertures 52 extending between the first chamber 34 and the second chamber 36. Although the apertures 52 are depicted to comprise cylindrical apertures defined entirely by the piston 32, it will be appreciated that aperture(s) may be provided in any of a variety of alternative configurations or locations for communicating fluid between respective chambers of a steering damper. It will be appreciated that the apertures 52 in the piston 32 can facilitate passage of fluid between the first chamber 34 and the second chamber 36 regardless of the position of the valve member 54 within the passageway 40. Accordingly, even when the valve member 54 is positioned to substantially or completely block the passage of fluid through the passageway 40, fluid can still pass through the apertures 52. With fluid passing through the apertures 52, the piston 32 may still move with respect to the cylinder housing 22, albeit not as quickly as the piston 32 would be capable of moving if the passageway 40 were unobstructed by the valve member 54. Accordingly, the quantity and dimension of the apertures 52 can be selected to effectuate a desired rate of movement of the piston 32 with respect to the cylinder housing 22 when the passageway 40 is blocked by the valve member 54 (e.g., during a kickback condition). In another embodiment, in which no apertures are provided in the piston, it will be appreciated that the valve member might be configured to only partially obstruct the passageway of a steering damper when an associated vehicle encounters kickback conditions, such that a limited amount of fluid is always permitted to pass through the passageway. In yet another embodiment, in which no apertures are provided in the piston, it will be appreciated that the valve member might be configured to completely obstruct the passageway of a steering damper when an associated vehicle encounters kickback conditions, such that any movement of the piston is prohibited during the kickback conditions.

Figure 7:
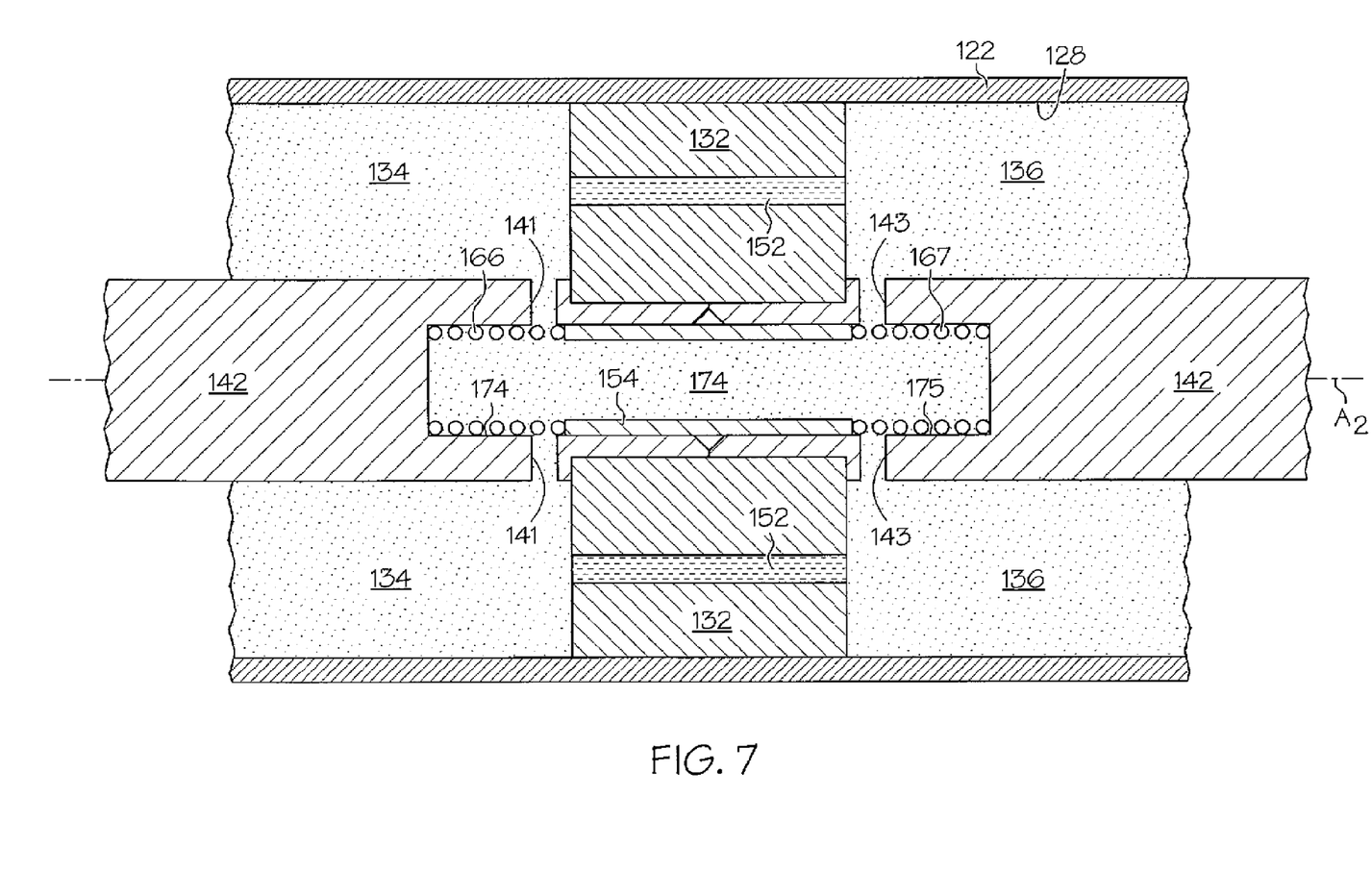
FIG. 7 is a cross-sectional view depicting a portion of a steering assembly in accordance with another embodiment, wherein a valve member is shown in a central position.
Figure 8:
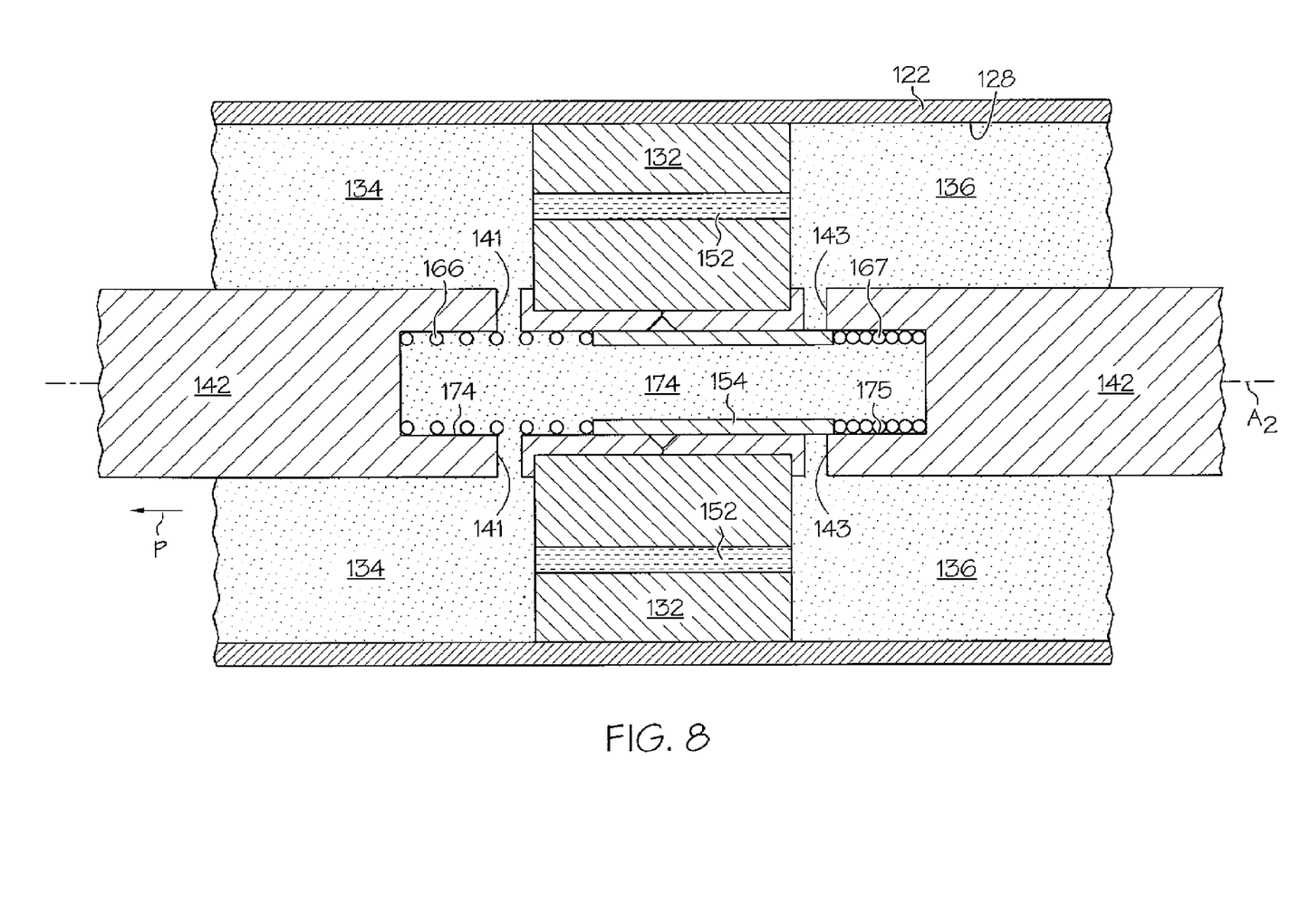
FIG. 8 is a cross-sectional view depicting the portion of the steering assembly of FIG. 7, wherein the valve member is shown in another position.

It will be appreciated that a valve member may be associated with a passageway in any of a variety of alternative configurations. For example, as illustrated in FIGS. 7-8, a piston 132 can slidably engage an inner surface 128 of a cylinder housing 122. A piston rod 142 is shown to be attached to the piston 132. A valve member 154 is shown in FIGS. 7-8 to be disposed within a passageway 174 defined by the piston rod 142 such that the valve member 154 is movable to selectively adjust restriction of fluid flow through the passageway 174 between a first chamber 134 and a second chamber 136. In particular, the valve member 154 is shown to have an elongated tubular shape and to be slidable within the passageway 174 (e.g., along the axis $A_2$) to selectively and alternatively block fluid from flowing through respective openings 141 and 143 in the piston rod 142.

The valve member 154 can be slidable along a straight path between a first position, a second position, and a third position. In a first position (shown in FIG. 8), the valve member 154 can substantially block the openings 143 for substantially preventing fluid flow through the passageway 174. In a second position (not shown), the valve member 154 can substantially block the openings 141 for substantially preventing fluid flow through the passageway 174. In a third position, as illustrated in FIG. 7, the valve member 154 can be positioned such that none of the openings 141 and 143 are blocked, and such that fluid can flow freely through the passageway 174. As shown in FIGS. 7-8, springs 166, 167 can be at least partially disposed within respective recesses 174, 175 in the piston rod 142 and can be provided in contact with opposite ends of the valve member 154 to facilitate biasing of the valve member 154 with respect to the piston rod 142. In this configuration, during normal driving conditions, the springs 166, 167 can bias the valve member 154 to the third position (shown in FIG. 7). However, during rapid accelerations of the piston rod 142, the valve member 154 can move within the passageway 174, thus resulting in compression of at least one of the springs (e.g., 167 in FIG. 8). It will be appreciated that varying the amount of force provided by the springs 166, 167 can affect the amount of acceleration which the piston rod 142 must experience to result in movement of the valve member 154. It will also be appreciated that movement of the valve member 154 within the passageway 174 can selectively dampen movement of the piston 132 within the cylinder housing 122, much as described above with respect to the example of FIGS. 1-6.

In addition to the passageway 174, one or more additional flow paths can be provided which extend between the first chamber 134 and the second chamber 136. For example, as illustrated in FIGS. 7-8, the piston 132 can be provided with apertures 152 extending between the first chamber 134 and the second chamber 136. The apertures 152 can be configured to facilitate passage of fluid between the first chamber 134 and the second chamber 136 such as described above with respect to the apertures 52 of FIG. 5. It will be appreciated that, in other embodiments, such additional flow paths can be provided in any of a variety of alternative configurations, or might not be provided at all.

It will also be appreciated that detection of acceleration and resultant movement of a valve member within a passageway may be achieved in any of a variety of alternative suitable configurations. For example, in one alternative embodiment (not shown), a sensor (e.g., an accelerometer) may be associated with a piston and a servo motor or other actuator may be provided to selectively move a valve member in response to signals from the sensor indicative of increased acceleration.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A steering damper comprising:
   a cylinder housing comprising an inner surface, the inner surface defining an inner area;
   a piston at least partially disposed within the inner area and movably engaged with the inner surface of the cylinder housing, the piston and the inner surface of the cylinder housing cooperating to define a first chamber and a second chamber disposed upon opposite sides of the piston;

a piston rod attached to the piston, at least one of the piston and the piston rod at least partially defining a passageway extending between the first chamber and the second chamber; and a valve member associated with the passageway and movable to adjust restriction of fluid flow through the passageway between the first chamber and the second chamber;

wherein the valve member comprises an elongate member extending between a first end and a second end, the first end of the valve member defines a first valve face, and the second end of the valve member defines a second valve face.

2. The steering damper of claim 1 wherein at least one of the piston and the piston rod at least partially defines a first valve seat and a second valve seat each being adjacent to the passageway, and the valve member is disposed at least partially within the passageway such that the first valve face corresponds with the first valve seat and the second valve face corresponds with the second valve seat.

3. The steering damper of claim 2 wherein the valve member is slidable between a first position in which the first valve face contacts the first valve seat to prevent fluid from flowing through the passageway, a second position in which the second valve face contacts the second valve seat to prevent fluid from flowing through the passageway, and a third position in which the first valve face is spaced from the first valve seat and the second valve face is spaced from the second valve seat to facilitate fluid flow through the passageway.

4. The steering damper of claim 3 wherein the valve member is slidable along a straight path from the first position, past the third position, and to the second position.

5. The steering damper of claim 3 wherein the passageway extends along a central axis defined by at least one of the piston and the piston rod.

6. The steering damper of claim 3 further comprising a biasing member disposed at least partially within the passageway and configured to bias the valve member with respect to the passageway.

7. The steering damper of claim 6 wherein the biasing member comprises a first spring and a second spring, the first spring is disposed at least partially within the passageway adjacent to the first valve seat and the first end of the valve member, and the second spring is disposed at least partially within the passageway adjacent to the second valve seat and the second end of the valve member.

8. The steering damper of claim 1 wherein the valve member is configured to move with respect to the passageway in response to acceleration of the piston with respect to the cylinder housing.

9. The steering damper of claim 1 wherein the piston defines at least one aperture extending between the first chamber and the second chamber.

10. A vehicle comprising:
a frame;
a steering shaft pivotally supported with respect to the frame; and
a steering damper attached to the frame and the steering shaft, the steering damper comprising:
a cylinder housing comprising an inner surface, the inner surface defining an inner area;
a piston at least partially disposed within the inner area and movably engaged with the inner surface of the cylinder housing, the piston and the inner surface of the cylinder housing cooperating to define a first chamber and a second chamber disposed upon opposite sides of the piston;

a piston rod attached to the piston, at least one of the piston and the piston rod at least partially defining a passageway extending between the first chamber and the second chamber; and a valve member associated with the passageway and movable to adjust restriction of fluid flow through the passageway between the first chamber and the second chamber;

wherein the valve member comprises an elongate member extending between a first end and a second end, the first end of the valve member defines a first valve face, and the second end of the valve member defines a second valve face.

11. A vehicle comprising:
a frame;
a steering shaft pivotally supported with respect to the frame; and
a steering damper attached to the frame and the steering shaft, the steering damper comprising:
a cylinder housing comprising an inner surface, the inner surface defining an inner area;
a piston at least partially disposed within the inner area and movably engaged with the inner surface of the cylinder housing, the piston and the inner surface of the cylinder housing cooperating to define a first chamber and a second chamber disposed upon opposite sides of the piston;
a piston rod attached to the piston, at least one of the piston and the piston rod at least partially defining a passageway extending between the first chamber and the second chamber; and
a valve member associated with the passageway and movable to adjust restriction of fluid flow through the passageway between the first chamber and the second chamber;
wherein at least one of the piston and the piston rod at least partially defines a first valve seat and a second valve seat each being adjacent to the passageway, the valve member comprises an elongate member extending between a first end and a second end, the first end of the valve member defines a first valve face, the second end of the valve member defines a second valve face, and the valve member is disposed at least partially within the passageway such that the first valve face corresponds with the first valve seat and the second valve face corresponds with the second valve seat, wherein the valve member is slidable between a first position in which the first valve face contacts the first valve seat to prevent fluid from flowing through the passageway, a second position in which the second valve face contacts the second valve seat to prevent fluid from flowing through the passageway, and a third position in which the first valve face is spaced from the first valve seat and the second valve face is spaced from the second valve seat to facilitate fluid flow through the passageway.

12. The vehicle of claim 11 further comprising a biasing member disposed at least partially within the passageway and configured to bias the valve member with respect to the passageway.

13. The vehicle of claim 12 wherein the biasing member comprises a first spring and a second spring, the first spring is disposed at least partially within the passageway adjacent to the first valve seat and the first end of the valve member, and the second spring is disposed at least partially within the passageway adjacent to the second valve seat and the second end of the valve member.

14. The vehicle of claim 11 wherein the valve member is configured to move with respect to the passageway in response to acceleration of the piston with respect to the cylinder housing.

15. A steering damper comprising:
- a cylinder housing comprising an inner surface, the inner surface defining an inner area;
- a piston at least partially disposed within the inner area and movably engaged with the inner surface of the cylinder housing, the piston and the inner surface of the cylinder housing cooperating to define a first chamber and a second chamber disposed upon opposite sides of the piston;
- a piston rod attached to the piston, at least one of the piston and the piston rod defining a passageway, a first valve seat, and a second valve seat, the passageway extending between the first chamber and the second chamber, the first valve seat being adjacent to the passageway, and the second valve seat being adjacent to the passageway;
- a valve member comprising a first valve face and a second valve face, the valve member disposed at least partially within the passageway such that the first valve face corresponds with the first valve seat and the second valve face corresponds with the second valve seat, wherein the valve member is movable to adjust restriction of fluid flow through the passageway between the first chamber and the second chamber;
- a biasing member configured to bias the valve member with respect to the passageway.

16. The steering damper of claim 15 wherein the biasing member comprises a first spring and a second spring, the first spring is disposed at least partially within the passageway adjacent to the first valve seat and the first valve face, and the second spring is disposed at least partially within the passageway adjacent to the second valve seat and the second valve face.

17. The steering damper of claim 15 wherein the valve member is configured to move with respect to the passageway in response to acceleration of the piston with respect to the cylinder housing.

18. The steering damper of claim 17 wherein the valve member is slidable between a first position in which the first valve face contacts the first valve seat to prevent fluid from flowing through the passageway, a second position in which the second valve face of contacts the second valve seat to prevent fluid from flowing through the passageway, and a third position in which the first valve face is spaced from the first valve seat and the second valve face is spaced from the second valve seat to facilitate fluid flow through the passageway.

* * * * *